United States Patent [19]

Davis

[11] Patent Number: 4,483,222
[45] Date of Patent: Nov. 20, 1984

[54] PIPE REAMING DEVICE

[76] Inventor: Dalton W. Davis, 214 W. Spinner, DeSoto, Tex. 75115

[21] Appl. No.: 297,495

[22] Filed: Aug. 28, 1981

[51] Int. Cl.³ .................. B23B 51/00; B23B 41/00
[52] U.S. Cl. ................................ 82/1.2; 82/4 C; 269/227; 408/91; 408/104; 408/147
[58] Field of Search ............... 82/1.2, 4 C, 4 R, 2 E, 82/44; 408/152, 154, 157, 164, 165, 166, 169, 170, 171, 147, 104-106, 90, 91, 87, 101; 51/338-344, 350-351; 269/227, 117; 74/788

[56] References Cited

U.S. PATENT DOCUMENTS

| | | | |
|---|---|---|---|
| 342,218 | 5/1886 | Miller | 408/164 |
| 909,469 | 1/1909 | Solberg | 269/227 |
| 2,343,500 | 3/1944 | Fairbairn et al. | 51/343 |
| 2,472,554 | 6/1949 | Volis . | |
| 2,478,471 | 8/1949 | Edlund | 81/3.42 |
| 2,676,659 | 4/1954 | Emmer | 269/227 |
| 3,228,268 | 1/1966 | Strout | 409/175 X |
| 3,266,345 | 8/1966 | Weisner et al. . | |
| 3,273,432 | 9/1966 | Hasund | 82/4 R |
| 3,335,526 | 8/1967 | Weiss . | |
| 3,754,832 | 8/1973 | Stickler . | |
| 3,772,940 | 11/1973 | Ohtsuka | 74/785 |
| 3,817,649 | 6/1974 | Medney . | |
| 3,851,546 | 12/1974 | Kepple et al. | 74/785 |
| 4,076,446 | 2/1978 | Lindstaedt . | |
| 4,097,180 | 6/1978 | Kwieraga . | |
| 4,235,259 | 11/1980 | Hudock . | |
| 4,289,430 | 9/1981 | Shashaty | 82/2 E X |

Primary Examiner—William R. Briggs
Assistant Examiner—Lawrence M. Meier
Attorney, Agent, or Firm—Gerald G. Crutsinger; John F. Booth; Monty L. Ross

[57] ABSTRACT

A device for removing pipe attached to a fitting includes cutting apparatus for removing the pipe disposed within the fitting. A wrench apparatus is connected to the cutting apparatus for gripping the fitting to prevent its movement when the cutting apparatus is activated. Alternatively, this device may be used as a reaming device which permits radial movement of the cutting blades into engagement with a pipe after the cutting blades have been inserted within the pipe.

8 Claims, 4 Drawing Figures

PIPE REAMING DEVICE

When an individual, such as a plumber, is installing a piping or fluid system, the most common materials used to construct the system are made from plastic or polymeric materials, such as polyethylene, polyvinylchloride and the like. To assemble the system, the individual attaches a fitting, such as a tee, elbow, cross, or reducer, to a pipe by inserting the pipe within the fitting and then using chemical solvents, adhesives or heating treatments to secure the fitting to the pipe. Should the individual make a mistake in this assembly, it is necessary to cut the fitting from the pipe and obtain another fitting or use fittings such as that disclosed in U.S. Pat. No. 4,235,259. The fitting having the piece of pipe attached thereto is then disposed of which is wasteful and expensive.

Accordingly, an object of the present invention is to provide apparatus for removing plastic pipe from a pipe fitting.

There are a number of tools available to the individual for working on pipe, such as reamers (See: U.S. Pat. No. 2,472,554 and U.S. Pat. No. 4,076,446), pipe scarfing tools (See: U.S. Pat. No. 3,335,526 and U.S. Pat. No. 3,817,649), pipe facing tools (See: U.S. Pat. No. 3,266,345), devices for deburring plastic pipes (See: U.S. Pat. No. 3,754,832), and chaser cutting apparatus (See: U.S. Pat. No. 4,097,180). However, no prior art apparatus has been developed for removing a pipe from a pipe fitting with the pipe fitting being supported to cooperate with a cutting device for removing the attached pipe. Further, none of these prior art devices include support apparatus which generally coaxially alignes the axis of rotation of a cutting blade with the attached pipe axis so as to permit generally concentric reaming of the pipe for removal of the fitting. Further, none of these prior art devices suggest reaming apparatus that uses cutting blades which are movable into engagement with the pipe after the cutting blades are disposed within the pipe.

It is, therefore a further object of the present invention to provide apparatus for removing a pipe from a pipe fitting such that the pipe fitting is supported to cooperate with a cutting device which facilitates removal of the pipe from the fitting.

Further, it is an object of the present invention to provide a reaming device that supports a pipe generally coaxially with a cutting apparatus such that the pipe is removed generally concentrically of the pipe axis.

Further, it is an object of the present invention to provide a device that permits positioning cutting blades within the pipe and adjusting the blades for reaming purposes after said blades have been positioned within the pipe.

In accordance with the invention, apparatus is provided for removing pipe attached to a pipe fitting. This apparatus includes cutting apparatus for removing attached pipe from the fitting and a wrench portion connected to the cutting device for gripping the pipe fitting to prevent movement of the fitting with the cutting device when the cutting device has been activated to remove the pipe.

Further, in accordance with the invention, a reaming device comprises apparatus for cutting pipe which includes a plurality of cutting blades, apparatus for moving the cutting blades from a first position wherein the cutting blades are moveable to a location within the pipe without engagement therewith to a second position wherein the blades are moveable into cutting engagement with the pipe, and apparatus for driving the cutting blades around an axis of rotation to cut the pipe when the blades are located in the second position with the pipe. Apparatus is connected to the cutting apparatus for supporting the pipe generally coaxially aligned with the axis of rotation of the cutting blades while preventing rotation of the pipe around the axis of rotation when the cutting blades are moved into the second position and rotated within the pipe.

Further, in accordance with the invention, a pipe reaming device comprises a plurality of blades for cutting the pipe. Apparatus is used to drive the blades around an axis of rotation and adjustment apparatus is operably connected to the blade driving apparatus for moving the cutting blades radially of the axis of rotation into engagement with the pipe after the blades have been moved inside the pipe without engagement therewith.

In the drawings, wherein like reference characters are use throughout to designate like parts:

Figure 1:
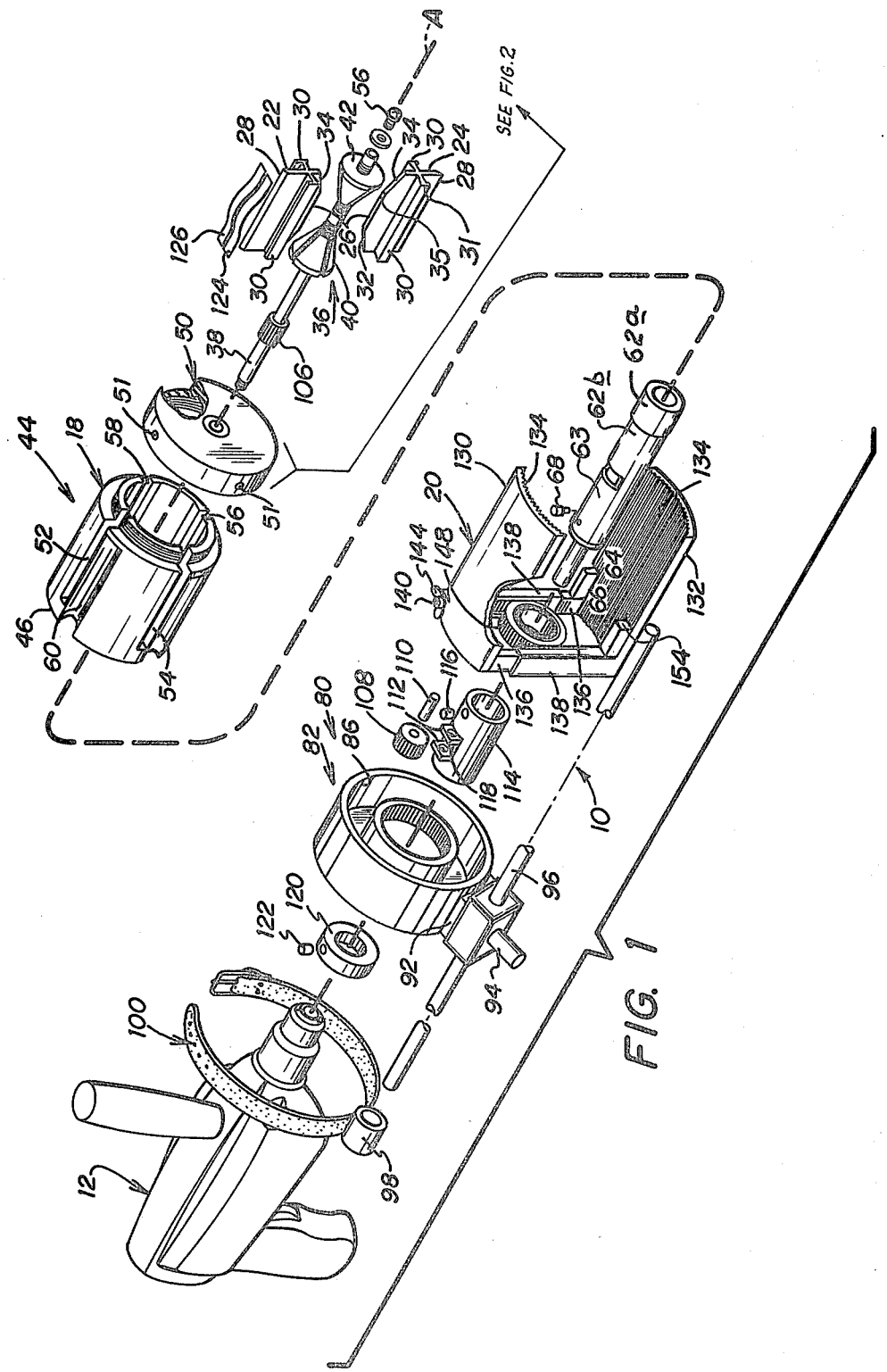
FIG. 1 is an exploded view of a pipe reaming device constructed according to the present invention with the cutting blade expanding assembly shown adjacent the tubular member for clarity.
Figure 4:
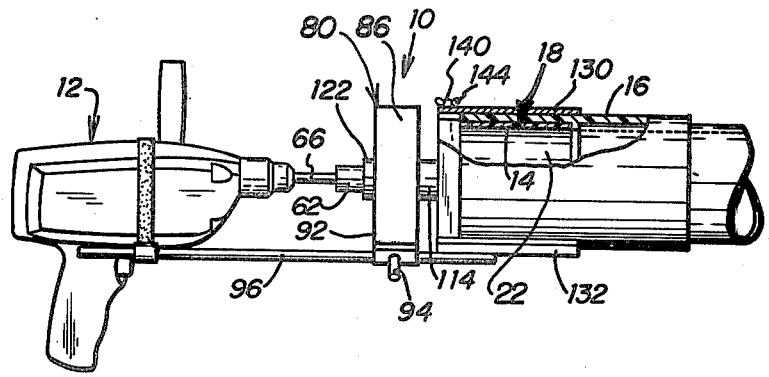
FIG. 4 is a side elevational view, partly in cross-section, of the invention illustrated in FIG. 1, when operating on a pipe.
Figure 3:
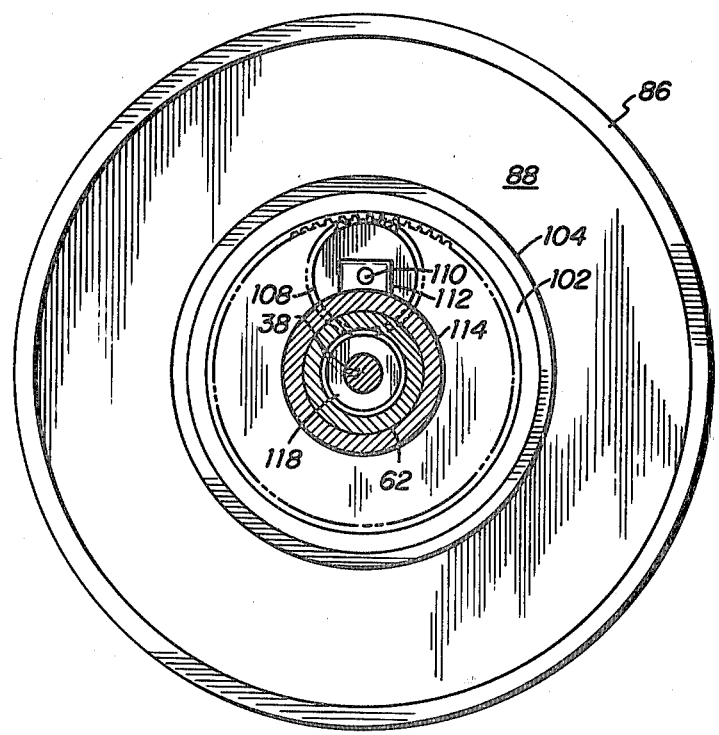
FIG. 3 is a cross-sectional view taken along the lines and in the direction of arrows 3—3 of the invention shown in FIG. 2.

Turning now to FIGS. 1 and 4, there is shown a pipe reaming device 10 powered by a hand drill 12 for removing a pipe 14 attached to a pipe fitting 16.

As best shown in FIGS. 1 and 4, device 10 includes a cutting apparatus 18 for removing pipe 14 and wrench apparatus 20 connected to cutting apparatus 18 for gripping pipe fitting 16 to prevent movement of fitting 16 when pipe 14 is being removed from fitting 16.

Figure 2:
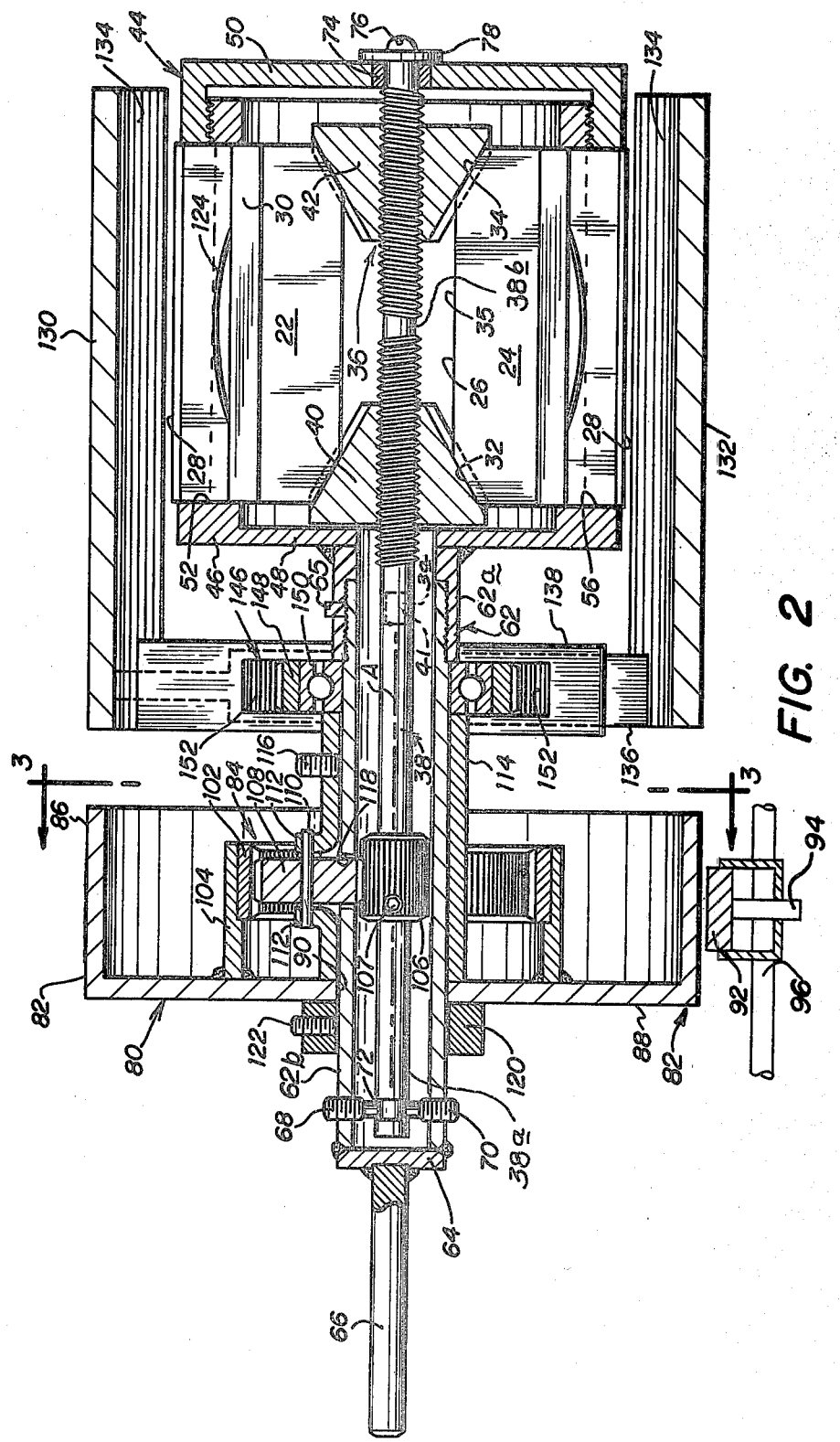
FIG. 2 is a side, elevational view, partly cross-sectional, of the assembled device shown in FIG. 1.

As best shown in FIGS. 1 and 2, cutting or reaming apparatus 18 includes a first cutting blade 22, a second cutting blade 24, and third and fourth cutting blades (not shown). Although the preferred embodiment includes four cutting blades, it should be recognized that any number of blades may be used as long as the cutting blades will be substantially dynamically balanced. Each cutting blade includes a first edge 26, defined by tapered shoulder portions 32 and 34 adjacent ends of edge 26 and a straight central portion 35, a second edge 28 for engaging and cutting the pipe, and a shoulder 30 extending transversally on each side of the cutting blade intermediate the first and second edges. Although each cutting blade preferably has an elongated cutting edge 28 for removing a length of pipe, it should be understood that cutting edge 28 may have different configurations to enable cutting different shapes in the pipe such as grooves to receive O-ring seals and channels to receive snap rings, and may be adapted to support polishing or sanding materials for surface working the pipe. Shoulder 30 includes a lip 31 disposed on the outboard end.

Apparatus 36 is provided to urge the cutting blades radially of an axis of rotation A. This urging apparatus includes a shaft 38 and first and second urging members 40 and 42, respectively, threadedly connected to shaft 38 for simultaneous movement toward or away from one another. Each urging member is in the shape of a truncated cone and slotted with a taper to match and receive shoulder portion 32 or 34 of first edge 26 of each cutting blade. Thus, when urging members 40 and 42 are moved toward one another, the cutting blades will be urged radially of the axis of rotation A which lies coaxially with shaft 38.

Moving apparatus 44 is provided for rotating the cutting blades of cutting apparatus 18 around axis of rotation A. Preferably, moving apparatus 44 includes a tubular member 46 with one end enclosed by a wall 48 and the other end enclosed by an end cap 50 threadedly joined to tubular member 46 and secured thereto by use of set screws 51. A slot 52 is provided through the sidewall of tubular member 46 for each cutting blade and, since it is preferred that four cutting blades be used, then slots 52, 54, 56, and 58 are provided. Further, groove 60 having an open end through wall 48 may be formed in the outer surface of tubular member 46 adjacent to each slot 52, 54, 56 and 58 so as to receive chips and allow the chips to move outwardly of tubular member 46 when the reaming apparatus is being used.

Rotary moving apparatus 44 further includes a first tubular sleeve 62 having one end connected to end wall 48 of tubular member 46, such as by welding, and the other end enclosed by cover 64 attached to sleeve 62, such as by welding. A stub shaft 66 is attached to cover 64 and extends outwardly of tubular sleeve 62. Further, stub shaft 66 is disposed coaxially with tubular sleeve 62, which is disposed coaxially of tubular member 46.

To insure substantially coaxial reaming of the pipe during operation, shaft 38 is disposed in coaxial alignment with rotary moving apparatus 44 by use of set screws 68 and 70 threadedly disposed through the second end of tubular shaft 62 in diametrically opposed relation for engaging shaft 38 within a channel 72. The other end of shaft 38 is supported coaxially within tubular member 48 by use of a bearing 74 disposed concentrically within end cover 50 and is prevented from axial movement by use of a screw 76 threadedly joined to the end of shaft 38 and acting through washer 78 against the outer surface of end cover 50. Thus, when stub shaft 66 is chucked into drill 12 and drill 12 activated, the cutting blades are continuously rotated about axis of rotation A of moving apparatus 44.

Cutting apparatus 18 may be modified to accommodate different size fittings by constructing sleeve 62 from a first sleeve portion 62a and a second sleeve portion 62b which are threadedly connected to one another, and by constructing shaft 38 from a first shaft portion 38a having a rectilinear extension 3a and a second shaft portion 38b having a rectilinear socket 41 which matingly receives the extension therein. To insure that sleeve portions 62a and 62b do not become separated from one another, a set screw 65 is provided to extend through sleeve portion 62a and engage sleeve portion 62b.

As best shown in FIGS. 1–4, apparatus 80 is used to move the cutting blades from a first position, wherein the cutting blades are not in contact with the pipe to be reamed and after the reaming device being disposed therein, to a second position, wherein the cutting blades are moved into cutting engagement with the pipe. Apparatus 80 uses a braking apparatus 82 and a planetary gear system 84.

As best illustrated in FIGS. 1 and 2, braking apparatus 82 includes a tubular body 86 supported coaxially about tubular sleeve 62 by use of a support wall 88. Support wall 88 has an aperture 90 disposed concentrically of the axis of tubular body 86 and is of sufficient size so as to receive tubular member 62 therein without engagement to permit relative free movement of tubular body 86 about tubular sleeve 62. A brake pad 92 is connected to plunger member 94, which extends through a frame 96. To prevent relative movement of frame 96, a receptacle 98 to receive a portion of frame 96 is connected to a strap 100 which may be attached to hand drill 12.

Planetary gear system 84 of apparatus 80 includes a ring gear 102 disposed annularly of tubular body 86 by use of intermediate support member 104 connected to support wall 88. A spur gear 106 is concentrically disposed around shaft 38 and fastened thereto by use of set screw 107 to form a sun gear in the planetary gear system. The planetary gear 108 is formed by a spur gear connected through its axis by use of a pin 110 extending through flanges 112 which are disposed on outer tubular sleeve 114 which is connected to tubular sleeve 62 by use of a set screw 116. Thus, planetary gear 108 is operably disposed between annular gear 102 through aligned openings 118 in tubular sleeves 62 and 64 and in meshing relationship with sun gear 106. To prevent movement of tubular body 86 and support wall 88 axially of tubular sleeve 62, a locking ring 120 is attached to tubular sleeve 62 by use of set screw 122.

For moving the cutting blades radially into engagement with a pipe to be reamed after the blades have been disposed within the pipe without engagement therewith, stub shaft 66 is chucked to hand drill 12 and hand drill 12 activated. Cutting apparatus 18 is positioned within the pipe without the cutting blades engaging the pipe, plunger 94 is then depressed so as to prevent rotation of tubular body 86 which in turn prevents rotation of ring gear 102 to thereby work through planetary gear 108 to cause sun gear 106 to rotate. Such rotation further causes shaft 38 to rotate which causes the threaded portion of shaft 38 to act as a gear to move first and second urging members 40 and 42, respectively, toward one another. Thus, the shoulders on urging members 40 and 42 act upon shoulder portions 32 and 34 to urge the cutting blades radially of the axis of rotation for engagement with the pipe.

If desired, each cutting blade and urging member may be designed so that outward movement is limited to substantially the same distance as the wall thickness of the pipe being removed from the fitting. This is accomplished by proper selection of the taper on shoulder portions 32 and 34 as well as the taper on urging members 40 and 42 and the distance through which members 40 and 42 are moved toward one another.

Further, if desired, leaf springs 124 and 126 are provided within lip 31 on shoulder 30 on either side of the cutting blade (FIG. 1) to act against the inner surface of the side wall of tubular member 46 and against shoulders 30. These springs will act on the cutting blades to move them inwardly towards shaft 38 as urging member 40 and 42 are moved away from one another, which occurs when reversing rotation of shaft 66 and preventing movement of body 86.

Wrench portion 20 is used to connect cutting device 18 to pipe fitting 16 such that pipe 14 is coaxially aligned with cutting apparatus 18. Wrench apparatus 20 includes clamp members 130 and 132 disposed to move toward one another. If desired, a plurality of teeth 134 may be disposed on the interior surface of clamp members 130 and 132 so as to engage the pipe fitting or pipe and to prevent rotation thereof about the axis of rotation of cutting apparatus 18 when the cutting apparatus is activated. Each clamp member 130 and 132 includes a bar 136 disposed at the corner of one end and a sleeve 138 disposed at the other corner on the same end. Bars 136 and sleeves 138 are arranged such that the bar of clamp member 130 is received within the sleeve of clamp member 132 and the bar 136 of clamp member 132 is received within the sleeve of clamp member 130. A screw member 140 is attached to bar 136 of clamp member 132 and extends through an opening provided in clamp member 130. A wing nut 144 is threadedly connected to screw member 140 so that clamp members 130 and 132 may be secured to fitting 16 or pipe 14.

To insure the pipe to be reamed is disposed coaxially around axis of rotation A, a rack and pinion gear system 146 are provided. This system includes a pinion 148 connected to a bearing device 150, which is supported coaxially on tubular sleeve 62. Gear teeth 152 are provided on the interior surface of each bar 136 with pinion gear 148 operably engaging teeth 152 on both bars 136. Thus, movement of either clamp member 130 or 132 will cause corresponding movement of the other clamp member which thereby disposes the pipe to be reamed coaxially with cutting apparatus 18 around axis of rotation A.

To insure the pipe to be reamed is disposed in proper longitudinal relation with the cutting blades, a member 154 is disposed at the junction of each sleeve 138 and the clamp member to form a shoulder to limit movement of the end of pipe 14 or fitting 16 toward rack and pinion gear system 146.

In operation, fitting 16 having pipe 14 attached thereto, is generally aligned with cutting apparatus 18. Jaws 130 and 132 are withdrawn a sufficient distance to permit movement of fitting 16 therebetween. Stub shaft 66 is rotated in cooperation with braking apparatus 82 so as to cause cutting blades to be moved radially inwardly by a sufficient amount to prevent engagement of the cutting blades with the pipe to be reamed. The cutting apparatus 18 of device 10 is then moved with the cutting blades disposed in pipe 14. Clamping jaws 130 and 132 are then moved so as to fix fitting 16 with pipe 14 coaxially aligned about the axis of rotation A of the cutting blades. Hand drill 12 is then chucked onto stub shaft 66 and strap 100 mounted thereto. If desired, a portion of frame 96 may be attached to lower jaw 132 so as to assist strap 100 in preventing rotation of brake pad 92 with tubular body 86. Upon activation of drill 12, cutting apparatus 18 is continuously rotated about its axis and by depressing plunger 94 to prevent movement of brake drum 86, the cutting blades will be urged outwardly and radially of axis of rotation A and into engagement with pipe 14. Upon complete removal of pipe 14 from fitting 16, stub shaft 66 is reversed so that urging members 40 and 42 are moved away from one another which permits the cutting blades to move radially inwardly away from the pipe fitting 16. Wing nut 144 is then reversed so as to permit disengaging clamp members 130 and 132 from pipe fitting 16. At that time, pipe fitting 16 may be reused.

The invention having been described, what is claimed is:

1. A device for removing pipe attached to a fitting, comprising: a tubular member; a tubular shaft operatively connected to said tubular member and disposed concentrically around an axis of rotation and having means for driven rotation; a cutting blade carried by said tubular member around the axis of rotation, said cutting blade having a cutting edge and a tapered edge; a drive shaft; an annulus gear supported concentrically around the axis of rotation; a sun gear disposed concentrically around the axis of rotation and connected to the drive shaft; a planetary gear operably disposed between the annulus and sun gears and rotatably connected at its axis for rotation with said tubular shaft; an urging member threadedly connected to the drive shaft for movement in first and second directions, the urging member having a surface coacting with the tapered edge of said blade to move the cutting edge into engagement with the pipe while said tubular member is being rotated; braking means for stopping rotation of said annulus gear to thereby turn the planetary gear and the sun gear and the drive shaft which moves the urging member in a direction such that the cutting edge of the blade engages the pipe; and wrench means for gripping the pipe fitting for supporting the fitting with the axis of the pipe to be removed disposed coaxially with the axis of rotation of said tubular member.

2. A device as set forth in claim 1, wherein said braking means include: a support rod connected to said wrench means, a push rod supported by said support rod, and, a friction pad connected to said push rod and disposed to engage a housing which supports the annulus gear.

3. A reaming device, comprising: means for cutting a pipe including a tubular member having slots formed in the wall thereof; a plurality of cutting blades extending through said slots; a tubular shaft operatively connected to said tubular member and disposed concentrically around an axis of rotation and having means for driven rotation; a drive shaft; an annulus gear supported concentrically around an axis of rotation; a sun gear disposed concentrically around the axis of rotation and connected to the drive shaft; a planetary gear operably disposed between said annulus and sun gears and rotatably connected at its axis for rotation with said tubular shaft; an urging member threadedly connected to the drive shaft for movement in first and second directions, the urging member having a surface co-acting with said cutting blades for moving the cutting blades through the slots while said tubular member is being rotated from a position wherein said cutting blades are not engagable with the pipe when said cutting blades are moved within the pipe to a position wherein the blades are movable into cutting engagement with the pipe; braking means for stopping rotation of said annulus gear to thereby turn the planetary gear and the sun gear and drive shaft which moves the urging members in a direction such that the cutting edges of the blades engage the pipe; means for driving the cutting blades around the axis of rotation to ream the pipe when the blades are positioned in cutting engagement with the pipe; and clamp means rotatably connected to said cutting means for supporting the pipe generally coaxially aligned with the axis of rotation of the cutting blades while preventing rotation of the pipe around the axis of rotation when the cutting blades are moved into engagement with the pipe.

4. A reaming device, comprising: a tubular member, means for rotating the tubular member around an axis of rotation; a plurality of cutting blades carried by said tubular member; a cutting edge and a tapered edge on each of said cutting blades, a tubular shaft connected to said tubular member and disposed concentrically around the axis of rotation, a drive shaft extending through said tubular shaft, an annulus gear supported concentrically around the axis of rotation, a sun gear connected to the drive shaft, a planetary gear operably disposed between said annulus and sun gears and rotatably connected at its axis for rotation with said tubular shaft, a wedge member threadedly connected to the drive shaft for movement in first and second directions, the wedge member having a surface co-acting with the tapered edge of said blade to move the cutting edge into engagement with the pipe, braking means for stopping rotation of said annulus gear to thereby turn the sun gear and drive shaft which moves the wedge members in a direction such that the cutting edge of the blade engages the pipe, and means for supporting the pipe generally coaxially aligned with the axis of rotation of the cutting blades while preventing rotation of the pipe around the axis of rotation when the cutting blades are moved into engagement with the pipe.

5. In a tool for attachment to the chuck of a drill motor, the improvement comprising: a shaft adapted to be driven by the drill motor; a pinion gear rotatably supported for rotation on said shaft; a pair of clamp members, each of said clamp members having a rack gear and a guide sleeve secured thereto such that the rack gear on one of said clamp members extends into the guide sleeve on the other of said clamp members, each of said rack gears being in meshing relation with said pinion gear; means to move the rack gear on one of said clamp members relative to the guide sleeve on the other clamp member for moving said clamp members in unison relative to said shaft; and a cutting tool drivingly connected to said shaft and maintained equidistant between said clamp members.

6. A tool according to claim 5, said means for moving the rack gear relative to the guide sleeve comprising threaded means to permit adjustment of the rack gear relative to the guide sleeve.

7. A tool according to claim 5, said cutting tool comprising a tubular member having guide slots formed therein; a plurality of cutting blades extending through said slots in said tubular member; resilient means between said tubular member and said cutting blades to bias said cutting blades toward an inoperative position; actuating means associated with said cutting blades for moving said blades relative to said tubular member from an inoperative position toward a cutting position; and means on said shaft for moving said actuating means relative to the cutting blades for moving said cutting blades to the cutting position while the tubular member and the cutting blades are being driven by said shaft.

8. A tool according to claim 5, said shaft comprising a hollow tubular shaft drivingly connected to said cutting tool; a drive shaft rotatably secured in said hollow tubular shaft; a sun gear secured to said drive shaft; a planetary gear secured to said tubular shaft, said tubular shaft having a circumferentially extending opening formed therein, said planetary gear extending through said circumferentially extending opening and in meshing relation with said sun gear; a ring gear rotatably secured relative to said tubular shaft and disposed in meshing relation with said planetary gear for imparting rotation to said sun gear if said ring gear is not rotating at the same angular velocity as the tubular shaft; and means to adjust the effective diameter of the cutting tool upon rotation of said drive shaft.

* * * * *

UNITED STATES PATENT AND TRADEMARK OFFICE
CERTIFICATE OF CORRECTION

PATENT NO. : 4,483,222
DATED : November 20, 1984
INVENTOR(S) : Dalton W. Davis

It is certified that error appears in the above-identified patent and that said Letters Patent is hereby corrected as shown below:

Column 6, line 8, change "shaft" to -- member --
Column 6, line 8, change "member" to -- shaft --

*Signed and Sealed this*

*Twenty-seventh* Day of *August 1985*

[SEAL]

*Attest:*

DONALD J. QUIGG

*Attesting Officer*     *Acting Commissioner of Patents and Trademarks*